Dec. 11, 1923.
A. F. CASKEY
ANTIGLARE ATTACHMENT
Filed Nov. 22, 1922      2 Sheets-Sheet 1
1,477,312
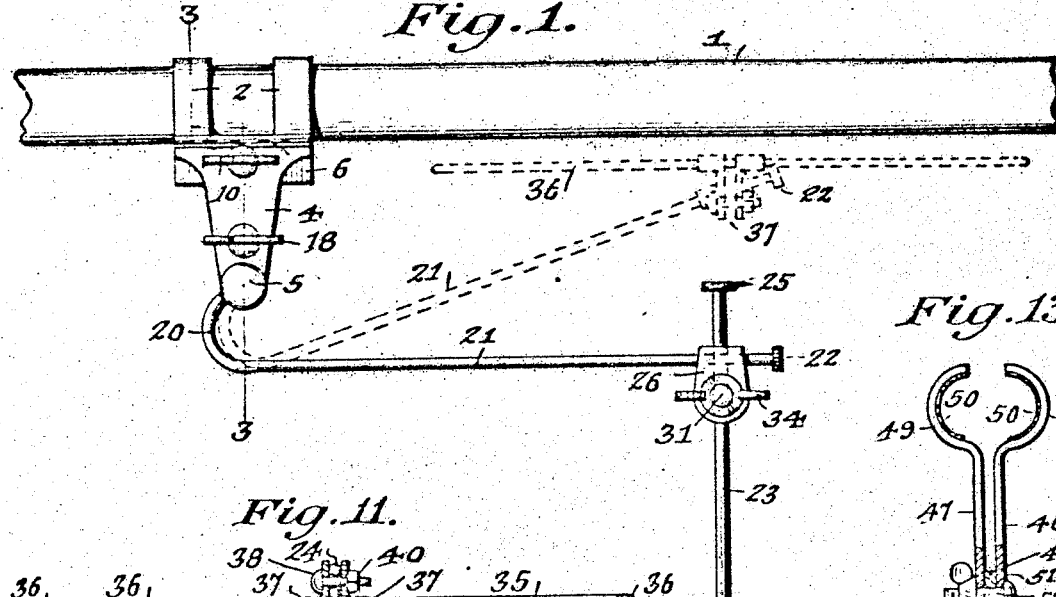
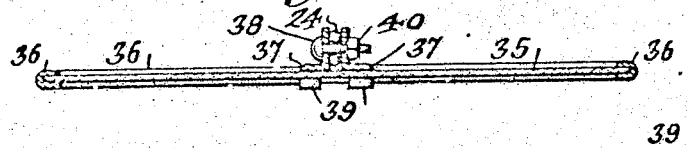
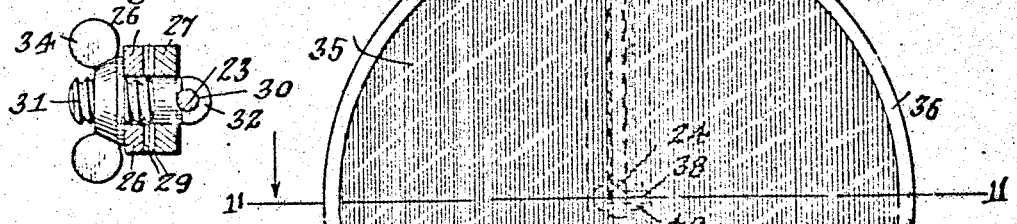
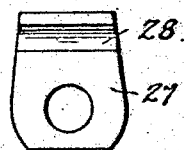
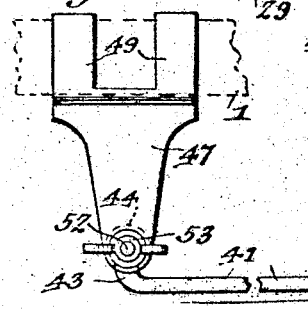
Albert F. Caskey, INVENTOR.
BY
Geo. F. Kimmel, ATTORNEY.

Dec. 11, 1923.                                       1,477,312
A. F. CASKEY
ANTIGLARE ATTACHMENT
Filed Nov. 22, 1922        2 Sheets-Sheet 2
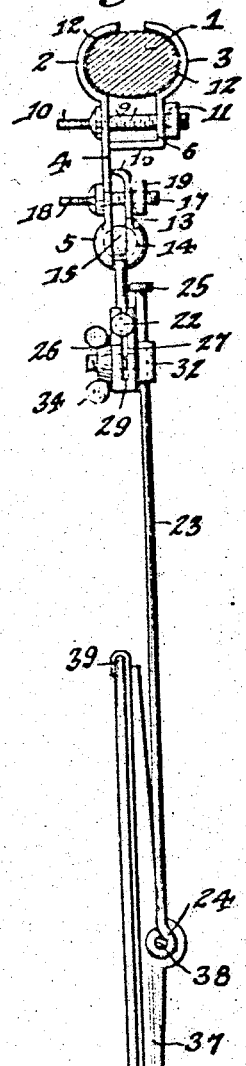
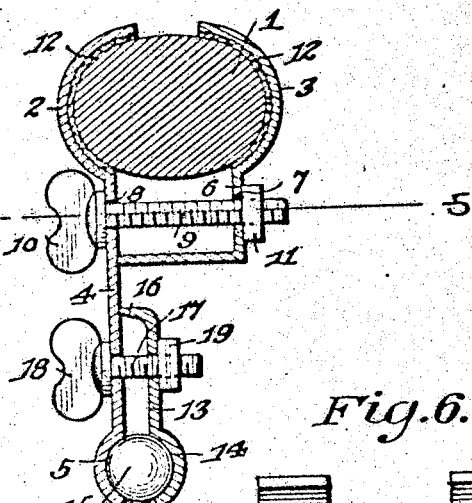
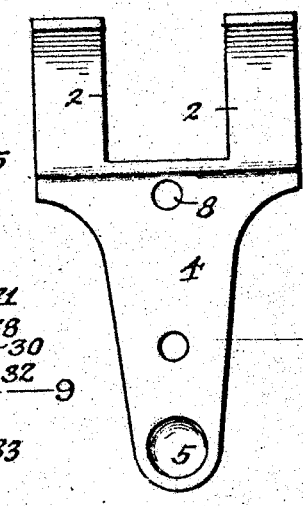
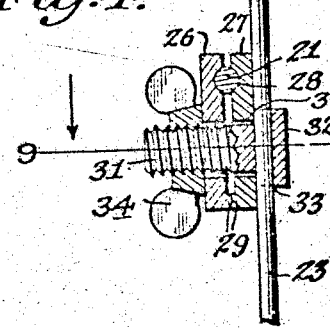
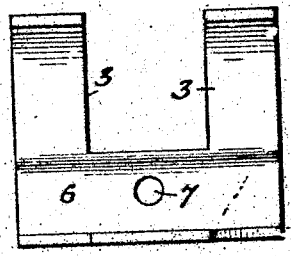
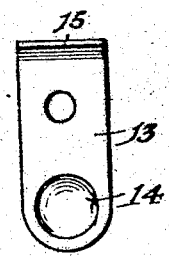
INVENTOR
Albert F. Caskey
BY
Geo. F. Kimmel ATTORNEY.

Patented Dec. 11, 1923.

1,477,312

UNITED STATES PATENT OFFICE.

ALBERT F. CASKEY, OF TIFFIN, OHIO.

ANTIGLARE ATTACHMENT.

Application filed November 22, 1922. Serial No. 602,662.

*To all whom it may concern:*

Be it known that I, ALBERT F. CASKEY, a citizen of the United States, residing at Tiffin, in the county of Seneca and State of Ohio, have invented certain new and useful Improvements in Antiglare Attachments, of which the following is a specification.

This invention relates to an anti-glare attachment designed primarily for use in connection with motor vehicles, but it is to be understood that an attachment in accordance with this invention can be employed for any purpose wherein it is found applicable, and the invention has for its object to provide in a manner as hereinafter set forth, an attachment of such class for shielding the eyes of the driver of the vehicle from the glare of the lamps of vehicles approaching from an opposite direction, as well from the reflected glare of certain classes or road surfaces, or from other objects, so as to overcome any blinding or inconvenient effects on the driver of the vehicle during the travel of the latter.

A further object of the invention is to provide in a manner as hereinafter set forth, an attachment for the purpose referred to, capable of being adjusted to any desirable position and further capable of being swung out of the way when not required, so as not to interfere in any manner with the driver of the vehicle.

Further objects of the invention are to provide an anti-glare attachment for the purpose set forth which is simple in its construction and arrangement, strong, durable, adjustable, efficient and convenient in its use, readily attached to the vehicle and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of an anti-glare attachment, in accordance with this invention, illustrating the attachment in operative position in full lines and in inoperative position in dotted lines.

Figure 2 is an edge view thereof,

Figure 3 is a section on line 3—3, Figure 1,

Figure 4 is a fragmentary view in vertical section,

Figure 5 is a section on line 5—5, Figure 3,

Figures 6 and 7 are elevations of the clamping elements for connecting the attachment with the vehicle frame, Figure 8 is an elevation of one of the universal joint members, Figure 9 is a sectional elevation of the adjustable coupling for the hanger rod for the shield, Figure 10 is an elevation of one of the elements of the coupling shown in Figure 9, Figure 11 is a section on line 11—11, Figure 1.

Figure 12 is a front view of a modification of the supporting rod and its connection with the bow of the vehicle.

Figure 13 is a vertical sectional view of the form shown in Figure 12.

Figure 14 is an elevation of the modified form of supporting rod.

An anti-glare attachment can be connected with the vehicle top or wind shield at any desirable point, preferably the attachment is connected with the bow member 1, of the top frame and for this purpose a clamping device is provided which consists of a pair of oppositely disposed semi-cylindrical clamping members 2, 3, which are adapted to have the bow 1, extend therebetween, as shown in Figure 1. The clamping member 2, has an elongated depending arm 4, formed with a concavo-convex lower terminal portion 5, the latter forming an element of a universal joint. The clamping member 3, has a depending L-shaped extension 6, with the horizontal leg thereof abutting against the arm 4. The vertical leg of the extension 6, is formed with an opening 7, arranged in alignment with an opening 8, formed in the arm 4. Extending through the aligning openings is a threaded bolt 9, provided at one end with a winged head 10, and at its other end with a securing nut 11. The head 10, abuts against the arm 4, and the nut 11 against the vertical leg of the extension 6, and when in such position the members 2, 3 are securely clamped to the bow 1. Flexible liners 12, are arranged in the members 2, 3, and bear against the body 1, to protect the latter when the members 2, 3 are clamped in position. Associated with the arm 4, is a socket member formed of a vertically disposed rectangular body 13, which terminates in a concavo-convex extension 14, opposing the concavo-convex lower terminal portion of the arm 4, and provided in connection therewith a socket for the reception of a globular head 15, the latter in connection with the concavo-convex portions 5 and 14, provides a universal joint.

The upper end of the body portion 13, of the socket member is provided with a right angular extension 16, which abuts against the arm 4, and extending through the latter, as well as through the body portion 14 is a clamping bolt 17, having one end provided with a winged head 18, and its other end with a securing nut 19. The head 18, abuts against the arm 4, and the nut 19 abuts the body portion 14, and when in such position the socket member is securely clamped to the arm 4. The head 18, further provides means for releasing the head 15, so it can be shifted in the manner desired, and it further provides means for securely clamping the head 15 from movement when occasion so requires.

Formed integral with the head 15, is a curved neck 20, of a supporting rod 21, the latter having its free end provided with a circular head 22. The neck 20, is directed upwardly toward the head and provides means whereby the rod 21, can be shifted upwardly at an inclination, as illustrated in dotted lines, Figure 1, when the attachment is moved to inoperative position.

Depending from the rod 21, is a hanger rod 23, having its lower terminus formed with an eye 24, and its upper terminus with a circular head 25. The hanger rod 23 can be shifted lengthwise with respect to the supporting rod 21, and further is capable of being angularly adjusted with respect to said supporting rod. The hanger rod 23, is adjustable in and connected with the supporting rod 21, by an adjustable coupling device, and the latter consists of a pair of oppositely disposed rectangular clamping plates 26, 27, each having its inner face, near its upper end formed with a groove 28, and at its lower end with an inwardly extending rib 29. When the plates 26, 27, are set up, they are maintained in spaced relation by the ribs 29, these latter abutting, and further the grooves 28, of the said plates oppose each other and provide a seat for the supporting rod 21. Each of the plates 26, 27, is formed with an opening 30, and these openings align and extending therethrough which extends the hanger rod 23, the latter bears against the plate 27. Mounted on the bolt 31, is a winged nut 34, which is employed for clamping the plates 26, 27 together, as well as clamping the hanger rod 23 to the plate 27. The nut 34, abuts against the plate 26, when the nut is in clamping position. When the nut 34 is released the hanger rod can be shifted to any desired position and the members 26, 27 shifted on the rod 21, as well as disposed at any suitable inclination. When the plates 26, 27, have been adjusted, as well as the rod 23, the nut 34 is screwed home and the coupling device and rod 23 are maintained in the position to which they have been adjusted.

The shield which is carried by the hanger rod consists of a panel of colored glass, preferably circular in contour, but it is obvious that the panel can be of any desired contour, and the said panel is indicated at 35, and is secured in a frame 36, whereby the edges of the panel are protected. The frame 36 is mounted in a holder formed of a pair of spaced bars 37, which are disposed diametrically with respect to the frame and each of the bars is provided at each end with a hook 39, which overlaps the frame, as shown in Figures 1 and 2. Carried by the bars 37, centrally thereof, is a pin 38, which extends through an eye 24 of the hanger rod 23, and by this arrangement the hanger rods 23 are connected with the shield. The bars 37, are arranged at the back of the shield and overlap the front of the frame 36, when the latter is mounted in the bars.

As before stated, the neck 20, provides means whereby the supporting rod can be shifted to an upwardly inclination as indicated in Figure 1, and this manner of adjusting the support bar 21, carries the hanger rod 23 therewith and as the latter can be shifted on the bar 21, the shield can be shifted to the position shown in dotted lines, Figure 1, so that when it is not desired to use the attachment, it can be moved to a position not to interfere with the driver.

The pin 38, is in the form of a bolt, which is threaded and carries a clamping nut 40, for the purpose of fixedly securing the shield in adjusted position when desired.

The universal joint between the supporting rod and clamping device permits of the supporting rod being adjusted to any desired position, and the adjustable coupling device between the hanger rod 23 and supporting rod 21, not only permits of adjusting of the hanger rod 23, lengthwise with respect to the support rod 21, but furthermore permits of the adjusting of the rod 23 to any desired angle and owing to the manner of connecting the shield to the hanger rod, the shield also can be adjusted to any desirable angle position.

Figures 12, 13 and 14, the supporting rod as indicated at 41, has one end provided with a head, 42, and its other end formed with a rectangular extension 43, terminating in a flat circular enlargement 44, formed with an opening 45. The enlargement 44 is arranged between the lower ends of the depending arms 46, 47, of a pair of clamping members 48, 49 respectively, which are adapted to be mounted on the bow 1. Liners 50, are provided for the clamping members 48, 49. The lower ends of the arms 46, 47, are apertured as at 51, and which align with the opening 45 in the enlargement 44. Extending through the aligning openings 51, is a headed bolt 52, carrying a winged nut 53, for the purpose of detachably connecting the rod 41 with the clamping members 48, 49. By this construction the manner of connecting the rod 41 is somewhat simplified and the universal spherical joint is dispensed with. The rod 41 is connected to the rod 23 in the manner as heretofore referred to in connection with the rod 21.

The shield is arranged when in operative position in a manner so it will shield the eyes of the driver from the glare of approaching lamps and from other objections, under such conditions preventing any blinding or inconvenient effects of the eyes of the driver, and although the preferred embodiment of the invention is as shown and described, yet it is to be understood that changes in the detail of construction can be had without departing from the spirit of the invention as claimed.

What I claim is:—

1. An anti-glare attachment for motor vehicles comprising a supporting rod formed with a curved neck, a clamping device for connecting said rod with a suitable support, an adjustable joint connection between one end of the said neck and said clamping device, a pair of opposed angularly adjustable coupling plates positioned against said rod and formed with registering openings, a hanger rod disposed at an angle with respect to said supporting rod, a clamping bolt extending through said openings and having its head formed with an opening for the reception of the hanger rod, a clamping nut adjustably mounted on the bolt for shifting said plates to coupling position and to provide for the clamping of the hanger rod to one of said plates by the head of the bolt, and a shield adjustably connected to said hanger rod.

2. An anti-glare attachment for motor vehicles comprising a supporting rod, a clamping device for connecting said rod with a support, a pair of apertured coupling plates positioned against said rod and formed with registering openings, an adjustable hanger rod, a clamping bolt extending through said openings and having its head provided with an opening for the reception of said hanger rod, a clamping nut mounted on said bolt for shifting said plates to clamping position with respect to the supporting rod and to provide for the clamping of the hanger rod to one of said plates by the head of the bolt, a holder adjustably connected between said holder and said hanger rod, and a shield carried by the holder.

3. An anti-glare attachment for motor vehicles comprising a supporting rod formed with a curved neck terminating in a spherical enlargement, a clamping device for connecting said rod with a support and further having means associating with said enlargement to provide for the adjustable connection of said rod with said device, a pair of opposed apertured coupling plates positioned against said rod and formed with aligning openings, an adjustable hanger rod, a clamping bolt extending through said openings and having its head provided with an opening for the reception of a hanger rod, means adjustably mounted on the bolt for shifting said plates to coupling position and to provide for the clamping of the hanger rod to one of said plates by the head of the bolt, and a shield adjustably connected to said rod.

4. An anti-glare attachment for motor vehicles comprising a clamping device adapted to be detachably connected with a support, a supporting rod, said rod and said device having cooperating means to provide for an adjustable connection between the rod and said device, a pair of opposed coupling plates positioned against said rod and formed with aligning openings, a hanger rod, a clamp bolt extending through said plates and having said hanger rod extending therethrough, means adjustably mounted on said bolt for shifting said coupling plates to operative position with respect to said supporting rod and further to provide for the clamping of the hanger rod to one of said plates by the head of the bolt, a holder adjustably connected to said hanger rod, and a shield carried by said holder.

In testimony whereof, I affix my signature hereto.

ALBERT F. CASKEY.